Patented Dec. 3, 1946

2,412,036

UNITED STATES PATENT OFFICE 2,412,036

THIOLACETIC ACID

Ellsworth Knowlton Ellingboe, Wilmington, Del., assignor to E. I. du Pont de Nemours & Company, Wilmington, Del., a corporation of Delaware No Drawing. Application March 20, 1943, Serial No. 479,918

2 Claims. (Cl. 260—500)

This invention relates to organic acids and more particularly to organic carbothiolic acids.

Carbothiolic acids have been prepared by a variety of methods but generally with a poor yield. Clarke and Hartman have described in J. Am. Chem. Soc. 46 1731 (1924) a method wherein they prepared thiolacetic acid in 70% yield by the reaction of acetic anhydride with hydrogen sulfide in the presence of acidic catalysts. Attempts to repeat the preparation were unsuccessful in that far lower yields were obtained.

The use of aluminum chloride with iron rust and of sodium chloride alone and with acetyl chloride were likewise unsuccessful in that small yields were obtained.

This invention has as an object the provision of a reproducible process for preparing carbothiolic acids in good yield. Another object is the preparation of thiolacetic acid. Other objects will appear hereinafter.

These objects are accomplished by the following invention wherein a carboxylic acid anhydride or a diacyl sulfide is reacted with hydrogen sulfide in the presence of an alkaline catalyst.

In the practice of this invention it is preferable to operate at elevated pressure, with an autoclave as the reactor. The autoclave should be equipped with a stirrer, a port for charging raw materials at atmospheric pressure, a line for introducing hydrogen sulfide under pressure, and means for controlling the reaction temperature. The reactor is charged with the acid anhydride or diacyl sulfide containing 1% by weight of an alkaline agent, such as sodium hydroxide, sodium acetate or sodium sulfide. The materials in the closed autoclave are then stirred and hydrogen sulfide is run in at full pressure from a weighed cylinder. Absorption begins immediately, accompanied by a readily controllable rise in temperature, and the mixture is kept, suitably at about 50° C., as long as the exothermic action continues. The consumption of hydrogen sulfide is steady and rapid until somewhat more than the theoretical amount has been absorbed, the excess reflecting the amount physically dissolved in the reaction mixture. When no further hydrogen sulfide is taken up (after about three hours for small scale batches) the process is finished and the reaction mixture is worked up. If distillable the crude thiol acid is first rapidly stripped from the mixture under reduced pressure, preferably after neutralization of the alkaline catalyst with a strong mineral acid. The stripped crude may then be purified by fractionation. No free alkali should be present during any extended distillation because of degradation which occurs under such conditions. Alternative methods of isolating the product depend upon the nature of the particular thiol acid concerned.

Although it is preferred to work at higher pressures the process may be carried out at atmospheric pressure. In this case there is absorption of hydrogen sulfide, but it is usually much slower. If desired, diluents or solvents may also be employed. The temperature of the reaction mixture is not critical, but should be kept as low as is consistent with a practical speed of reaction, preferably 20° to 60° C.

The more detailed practice of the invention is illustrated by the following examples, wherein parts given are by weight. There are of course many forms of the invention other than these specific embodiments.

Example I

A mixture of 102 parts of acetic anhydride and 2 parts of hydrated sodium sulfide was placed in a pressure reaction vessel mounted on a shaker apparatus. The mixture was shaken under 12–43 pounds of hydrogen sulfide pressure from a cylinder connected directly to the reactor through a flexible pressure hose. During the absorption the contents of the cylinder were replenished from time to time from a hydrogen sulfide storage cylinder independently connected thereto. The temperature of the reaction mixture rose spontaneously to about 50° C. in the first quarter hour, and then dropped off slowly to about 35° C. in the next half hour. The mixture was then heated externally to a temperature of 60° C. for the remainder of the reaction. After a total of four and a quarter hours the absorption of hydrogen sulfide practically ceased, and the contents of the reaction vessel were allowed to cool. The crude product was distilled under reduced pressure, the distillate boiling from 30°/202 mm. to 72°/98 mm. being collected and fractionated at atmospheric pressure. In this way 53.2 parts of thiolacetic acid, boiling mainly at 85.5–87.5° C., was obtained. This is 70% of the theoretical.

Example II

A mixture of 8000 parts of 95% acetic anhydride and 80 parts of powdered sodium hydroxide was stirred in a stainless steel autoclave while under the full pressure (about 300 lbs.) of hydrogen sulfide from a weighed cylinder. There was an initial rise in temperature to 55° C. which was kept from increasing by external cooling. The total absorption of hydrogen sulfide in three hours was 2625 parts by weight. Analysis of the reaction mixture by distillation under reduced pressure followed by careful fractionation at atmospheric pressure showed a yield of 4985 parts of thiolacetic acid. This is 88% of the theoretical.

*Example III*

A mixture of 75.7 parts of diacetyl sulfide and 0.7 of sodium hydroxide was shaken with hydrogen sulfide under 15–45 lbs. pressure until there was no further absorption. This required a total of two hours. Crude thiolacetic acid was stripped out at 200 mm. pressure and then fractionated at atmospheric pressure to yield 57 parts of purified product—about 58.5% of theory.

The reaction of hydrogen sulfide with acid anhydrides or diacyl sulfides, i. e., with compounds $(RCO)_2X$ where $X$ is a chalcogen of atomic weight less than 33 may be carried out at atmospheric or superatmospheric pressures. The temperature of the reaction is not critical but should be kept below decomposition ranges. Any alkaline catalyst, i. e., any catalyst having a pH above 7.0 in aqueous solution, may be employed including alkali metal oxides, hydroxides, and salts of weak acids, and alkaline earth compounds such as calcium, barium, and strontium sulfides, hydroxides, and acetates. Under the conditions employed, the basic catalyst reacts in a manner corresponding to that of the basic salt of the organic anhydride used; for example, in acetic anhydride, an alkali hydroxide is roughly equivalent in catalytic action to the corresponding alkali acetate. Any acid anhydride or diacyl sulfide may be employed including acetic anhydride, propionic anhydride, succinic anhydride and other polymethylene anhydrides, benzoic anhydride, phthalic anhydride, and diacetyl sulfide.

The compounds useful may be defined as chalcogenides wherein a chalcogen (J. Am. Chem. Soc. 63 892 (1941)) of atomic weight less than 33 has its two valences satisfied by acyl radicals, i. e., by two monoacyl radicals or by one diacyl radical.

The process is desirably carried out at superatmospheric pressure as it is more rapid and complete. Thus 70% reaction is obtained in 24 hours at atmospheric pressure whereas 90% reaction is obtained in three hours under the vapor pressure of liquid hydrogen sulfide using otherwise equivalent conditions.

Thiol acids are particularly useful in the synthesis of organic sulfur compounds, being especially useful in reaction with unsaturated compounds to produce thiol esters. Secondary derivatives are thiols, many of which are readily obtainable only from the thiol esters derivable from thiol acids. Thiolacetic acid in particular is also valuable as a convenient equivalent of hydrogen sulfide in analytical chemistry.

The above description and examples are intended to be illustrative only. Any modification of or variation therefrom which conforms to the spirit of the invention is intended to be included within the scope of the claims.

What is claimed is:

1. A process for the preparation of thiolacetic acid which comprises reacting acetic anhydride with hydrogen sulfide in the presence of sodium acetate.

2. A process for the preparation of thiolacetic acid which comprises reacting acetic anhydride with hydrogen sulfide in the presence of an alkali metal acetate.

ELLSWORTH KNOWLTON ELLINGBOE.